United States Patent
Sakamoto (10) Patent No.: US 10,968,963 B2
(45) Date of Patent: Apr. 6, 2021

(54) ELECTROMAGNETIC CLUTCH AND COMPRESSOR PROVIDED WITH SAME

(71) Applicant: SANDEN AUTOMOTIVE COMPONENTS CORPORATION, Isesaki (JP)

(72) Inventor: Yuki Sakamoto, Isesaki (JP)

(73) Assignee: Sanden Automotive Components Corporation, Isesaki (JP)

( * ) Notice: Subject to any disclaimer, the term of this patent is extended or adjusted under 35 U.S.C. 154(b) by 104 days.

(21) Appl. No.: 16/349,134

(22) PCT Filed: Oct. 10, 2017

(86) PCT No.: PCT/JP2017/037297
§ 371 (c)(1),
(2) Date: May 10, 2019

(87) PCT Pub. No.: WO2018/088128
PCT Pub. Date: May 17, 2018

(65) Prior Publication Data
US 2019/0271364 A1 Sep. 5, 2019

(30) Foreign Application Priority Data

Nov. 11, 2016 (JP) .............................. JP2016-221030

(51) Int. Cl.
*F16D 27/112* (2006.01)
*F16D 27/14* (2006.01)
(Continued)

(52) U.S. Cl.
CPC ............ *F16D 27/112* (2013.01); *F16D 27/10* (2013.01); *F16D 27/14* (2013.01); *F16D 2027/002* (2013.01)

(58) Field of Classification Search
CPC ... F16D 27/112; F16D 27/10; F16D 2027/002
See application file for complete search history.

(56) References Cited

U.S. PATENT DOCUMENTS 4,799,578 A   1/1989   Matsushita
5,984,069 A * 11/1999   Takahashi ............. F16D 27/112
                                                              192/84.1
(Continued)

FOREIGN PATENT DOCUMENTS

CN   105074254 A   11/2015
JP   S57-082227 U   5/1982
(Continued)

OTHER PUBLICATIONS

Japan Patent Office, International Search Report issued in International Application No. PCT/JP2017/037297, dated Jan. 9, 2018.
(Continued)

*Primary Examiner* — Stacey A Fluhart
(74) *Attorney, Agent, or Firm* — Baker Botts L.L.P.

(57) ABSTRACT

Provided is an electromagnetic clutch capable of shortening, even in a low temperature atmosphere, the fuse reaction time from when a rotating shaft is locked, while preventing or suppressing malfunction of the thermal fuse. An electromagnetic clutch 1 is equipped with a rotor 2, an armature 3, an electromagnetic coil unit 4, a thermal fuse 5, and a thermally actuated switch 6. The thermally actuated switch 6 is connected in series to an electromagnetic coil 41 of the electromagnetic coil unit 4 along with the thermal fuse 5. When a temperature of the thermally actuated switch 6 exceeds a switching temperature (predetermined temperature) Ts, the thermally actuated switch 6 is displaced in an electric power supply OFF direction, and thereafter, it is displaced in an electric power supply ON direction due to a reduction in temperature. The thermally actuated switch 6 turns ON/OFF the electric power supply to the electromagnetic coil 41 such that the thermal fuse vicinity temperature T1 does not exceed the operational temperature Tf of the thermal fuse 5 due to self-heating of the electromagnetic coil 41 itself generated by the electric power supplied to the electromag- (Continued)

netic coil 41, thereby preventing malfunction of the thermal fuse 5 due to self-heating of the electromagnetic coil 41.

7 Claims, 7 Drawing Sheets

(51) Int. Cl.
*F16D 27/10* (2006.01)
*F16D 27/00* (2006.01)

(56) References Cited

U.S. PATENT DOCUMENTS

| | | | | |
|---|---|---|---|---|
| 6,161,671 | A * | 12/2000 | Sakamoto | F16D 27/112 |
| | | | | 192/82 T |
| 7,040,102 | B2 * | 5/2006 | Higashiyama | B60H 1/3225 |
| | | | | 418/69 |
| 2004/0211197 | A1 | 10/2004 | Higashiyama et al. | |
| 2016/0053830 | A1 | 2/2016 | Mogi | |

FOREIGN PATENT DOCUMENTS

| | | |
|---|---|---|
| JP | S62-126627 U | 8/1987 |
| JP | 08-247171 A | 9/1996 |
| JP | 2004-270644 A | 9/2004 |

OTHER PUBLICATIONS

The State Intellectual Property Office of the People's Republic of China, The First Office Action issued in Chinese Patent Application No. CN 201780069253.6, dated Jan. 9, 2020.

* cited by examiner

ELECTROMAGNETIC CLUTCH AND COMPRESSOR PROVIDED WITH SAME

CROSS-REFERENCE TO RELATED APPLICATIONS

This application is a U.S. National Stage Patent Application under 35 U.S.C. § 371 of International Patent Application No. PCT/JP2017/037297, filed on Oct. 10, 2017, which claims the benefit of Japanese Patent Application No. 2016-221030, filed on Nov. 11, 2016, the disclosures of each of which are incorporated herein by reference in their entirety.

TECHNICAL FIELD

The present invention relates to an electromagnetic clutch and, in particular, relates to an electromagnetic clutch intermittently transmitting power of a vehicle engine or a motor to a compressor of a vehicle air conditioner, or the like.

BACKGROUND ART

As an example of an electromagnetic clutch of this type, there is known the electromagnetic clutch disclosed in Patent Document 1. The electromagnetic clutch disclosed in Patent Document 1 is equipped with a rotor rotated by the power of a drive source, an armature arranged opposite this rotor and connected to the rotating shaft of a compressor, an electromagnetic coil unit having a bobbin around which an electromagnetic coil is wound and causing the rotor and the armature to be magnetically attracted to each other by electric power supplied to this electromagnetic coil unit, and a thermal fuse that is blown when a temperature thereof exceeds a predetermined operational temperature to interrupt the electric power supply to the electromagnetic coil. In an electromagnetic clutch of this type, when the rotating shaft of the compressor is locked for some reason or other, slippage is generated in the contact portion between the armature and the rotor, so that the temperature of this contact portion is increased to an abnormal degree due to frictional heat. In this abnormal condition, the thermal fuse interrupts the electric power supply to the electromagnetic coil to forcibly release the connection between the rotor and the armature, whereby it is possible to avoid excessive load being applied to the drive source side such as the engine and the motor, and it is possible to prevent or suppress breakage or the like of a component such as the rotor bearing or the driving belt due to frictional heat.

REFERENCE DOCUMENT LIST

Patent Document

Patent Document 1: JP H8-247171 A

SUMMARY OF THE INVENTION

Problem to be Solved by the Invention

Here, in an electromagnetic clutch of this type, when electric power is supplied to the electromagnetic coil, even during normal operation in which the rotating shaft is not locked, the temperature of the electromagnetic coil increases due to self-heating of the electromagnetic coil itself. Thus, during normal operation, blowing of the thermal fuse due to self-heating of the electromagnetic coil must be avoided. That is, once the thermal fuse is blown, it is impossible to restore the electric power supplied to the electromagnetic coil, so that it is necessary to prevent malfunction of the thermal fuse due to self-heating of the electromagnetic coil (erroneously blown).

In view of the above, in an electromagnetic clutch of this type, in order to prevent malfunction of the thermal fuse due to self-heating of the electromagnetic coil, the operational temperature of the thermal fuse (blowing temperature) is generally set to be higher than the maximum attainable temperature of the electromagnetic coil due to self-heating of the electromagnetic coil itself under the severest conditions imaginable. That is, the operational temperature of the thermal fuse is set to a higher temperature than necessary taking into consideration the maximum attainable temperature due to the self-heating of the electromagnetic coil. For example, in a case in which the maximum attainable temperature of the electromagnetic coil due to self-heating is approximately 170° C., the operational temperature of the thermal fuse is set to be 180° C. Thus, for example, in a low temperature atmosphere in which the temperature increase rate due to frictional heat of the armature and the rotor is low, the requisite time from when the rotating shaft is locked to when the temperature of the thermal fuse reaches the operational temperature (that is, the time from the moment of locking until the thermal fuse is blown) is longer than that in a high temperature atmosphere. Thus, in the conventional electromagnetic clutch, in particular, in a low temperature atmosphere, the time actually required from when the rotating shaft is locked to when the thermal fuse is operated is relatively long, so that there is a possibility that components such as a bearing of the rotor and a driving belt, the engine, or the like are not sufficiently protected.

The present invention has been made in view of the above problem. It is an object of the present invention to provide an electromagnetic clutch capable of shortening, even in a low temperature atmosphere, the requisite time from when the rotating shaft is locked to when the thermal fuse is operated (fuse reaction time) while preventing or suppressing malfunction of the thermal fuse due to self-heating of the electromagnetic coil.

Means for Solving the Problem

According to an aspect of the present invention, an electromagnetic clutch includes: a rotor rotationally driven by power of a drive source; an armature arranged opposite the rotor and connected to a rotating shaft of a driven apparatus; an electromagnetic coil unit having an electromagnetic coil and causing the rotor and the armature to be magnetically attracted to each other by electric power supplied to the electromagnetic coil; and a thermal fuse arranged in the vicinity of one end surface portion on the armature side of the rotor and configured to be blown when the temperature of the thermal fuse exceeds a predetermined operational temperature to turn OFF the electric power supply to the electromagnetic coil. The electromagnetic clutch includes a thermally actuated switch that is connected in series to the electromagnetic coil along with the thermal fuse, that is displaced in an electric power supply OFF direction when the temperature of the thermal fuse exceeds a predetermined temperature, and thereafter, is displaced in an electric power supply ON direction by a reduction in temperature, turning ON/OFF the electric power supply to the electromagnetic coil such that a temperature in the vicinity of the thermal fuse does not exceed the operational temperature due to self-heating of the electromagnetic coil itself generated by electric power supplied to the electromagnetic coil.

Effects of the Invention

In the electromagnetic clutch according to the above aspect, the thermally actuated switch turns ON/OFF the electric power supply to the electromagnetic coil such that the temperature in the vicinity of the thermal fuse does not exceed the operational temperature due to self-heating of the electromagnetic coil itself. Thus, it is possible to prevent malfunction of the thermal fuse due to self-heating of the electromagnetic coil itself by the thermally actuated switch during normal operation in which the rotating shaft is not locked. In this way, it is possible to prevent malfunction of the thermal fuse by the thermally actuated switch, so that it is possible to set the operational temperature of the thermal fuse without taking into consideration the maximum attainable temperature due to the self-heating of the electromagnetic coil itself under the severest conditions imaginable. Accordingly, it is unnecessary to set the operational temperature of the thermal fuse at a level higher than necessary. As a result, it is possible to set the operational temperature of the thermal fuse lower than the conventional set value (e.g., 180° C.), and when the rotating shaft is locked, it is possible to interrupt the electric power supply to the electromagnetic coil more quickly than in the prior art. Thus, even in a low temperature atmosphere, it is possible to shorten the electric power supply time in the locked state, making it possible to more reliably protect components such as the bearing of the rotor and the driving belt or the drive source such as the engine.

In this way, there is provided an electromagnetic clutch capable of shortening, even in a low temperature atmosphere, the requisite time from when the rotating shaft is locked to when the thermal fuse is operated (fuse reaction time) while preventing or suppressing malfunction of the thermal fuse due to self-heating of the electromagnetic coil.

MODE FOR CARRYING OUT THE INVENTION

In the following, embodiments of the electromagnetic clutch according to the present invention will be described with reference to the attached drawings.

Figure 1:
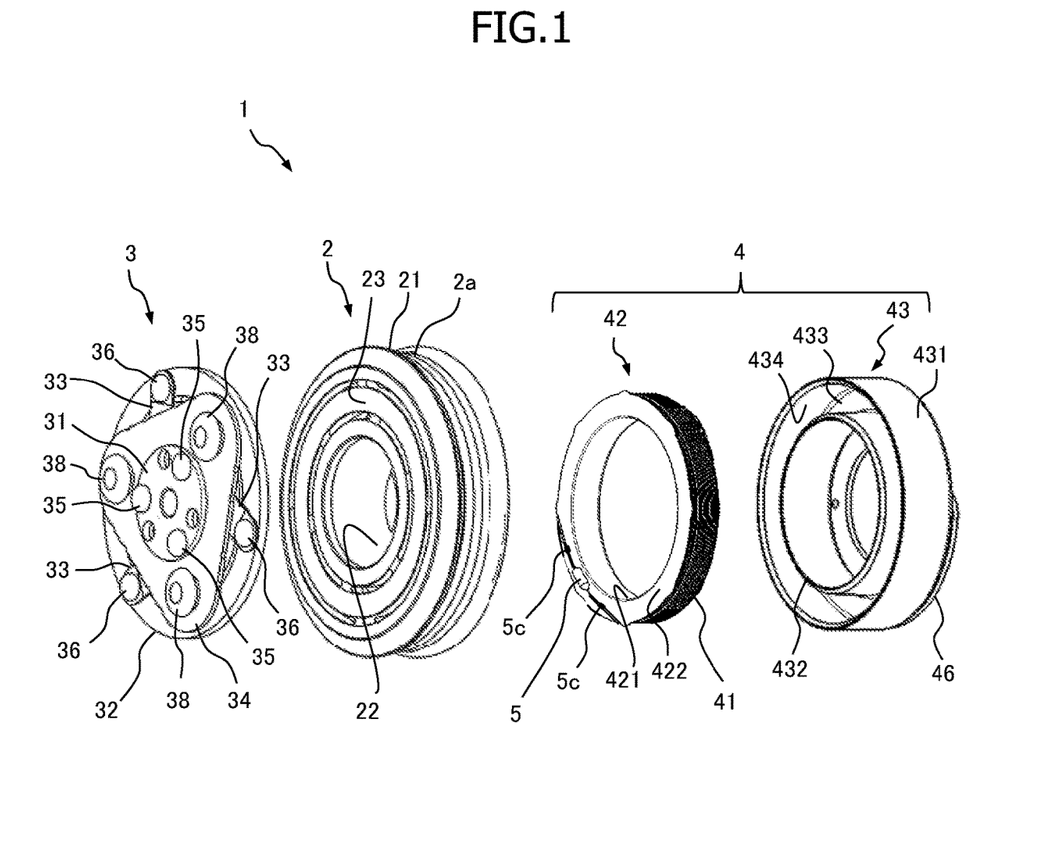
FIG. 1 is an exploded perspective view of an electromagnetic clutch according to the first embodiment of the present invention.
Figure 2:
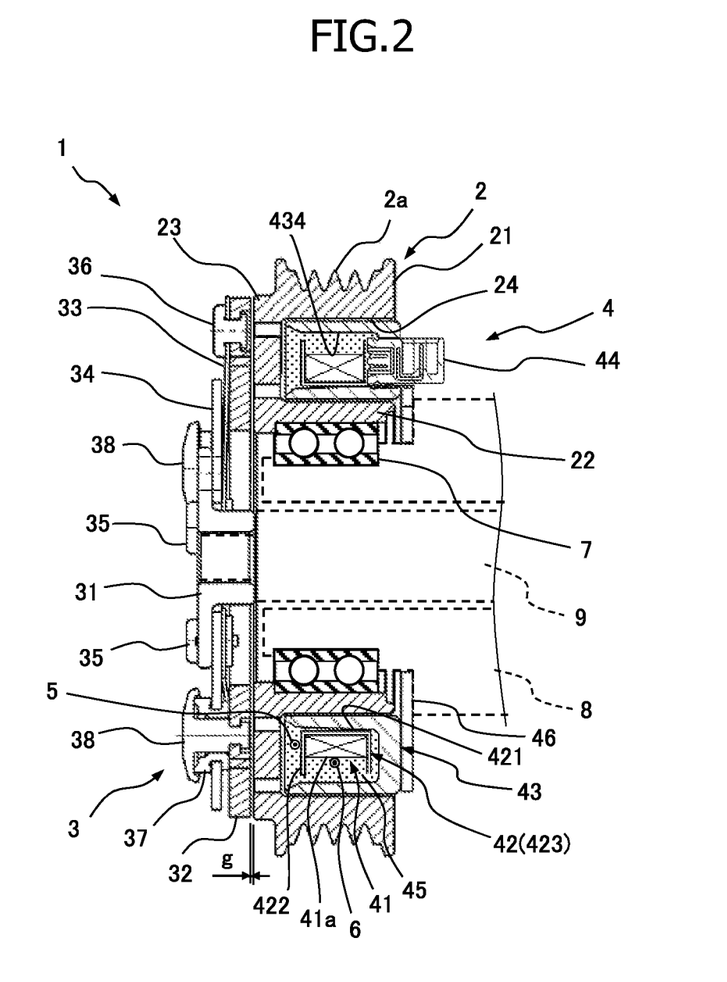
FIG. 2 is a sectional view of the electromagnetic clutch.

FIGS. 1 and 2 illustrate the structure of an electromagnetic clutch 1 according to the first embodiment of the present invention. FIG. 1 is an exploded perspective view of the electromagnetic clutch 1, and FIG. 2 is a sectional view of the electromagnetic clutch 1.

The electromagnetic clutch 1 of the present embodiment is incorporated into a compressor constituting, for example, a vehicle air conditioner, and intermittently transmits the power of a vehicle engine and a motor as a drive source to a compressor as a driven apparatus. That is, the electromagnetic clutch 1 effects switching between the transmission of power from the engine or the motor to the compressor and the interruption thereof. The compressor according to the present invention is equipped, for example with the electromagnetic clutch 1, and embodiments thereof will be described below. The compressor is operated by transmitting power from the engine or the motor, and stops its operation when the transmission of power from the engine or the motor is interrupted. As the compressor of the present invention, it is possible to adopt, for example, a swash plate type variable displacement compressor. Furthermore, it is possible to adopt a variable displacement compressor of some other type, or a scroll type or a vane type fixed displacement compressor.

As illustrated in FIGS. 1 and 2, the electromagnetic clutch 1 includes a rotor 2 rotationally driven by the power of an engine or a motor, an armature 3 arranged opposite the rotor 2, an electromagnetic coil unit 4 causing the rotor 2 and the armature 3 to be magnetically attracted to each other, a thermal fuse 5, and a thermally actuated switch 6. In FIG. 1, the thermally actuated switch 6 is not shown.

The rotor 2 is formed in an annular configuration, and the inner peripheral surface thereof is rotatably supported by the outer peripheral surface of a compressor housing 8 (indicated by the broken line in FIG. 2) via a bearing 7. In the outer peripheral surface of the rotor 2, a belt groove 2a is formed, and the outer peripheral surface of the rotor 2 functions as a pulley. More specifically, the rotor 2 has an outer tubular portion 21 having the outer peripheral surface, an inner tubular portion 22 having the inner peripheral surface and concentrically arranged with the outer tubular portion 21, and an annular plate-like connection portion 23 connecting the outer tubular portion 21 and the inner tubular portion 22 at one end side, and these are integrated with each other (see FIG. 2). The connection portion 23 of the rotor 2 is opposite the armature 3. In the present embodiment, the connection portion 23 of the rotor 2 corresponds to the "armature side one end surface portion of the rotor" of the present invention.

To the outer peripheral surface of the rotor 2 in which the belt groove 2a is formed, a driving belt (not shown) is mounted, and the rotor 2 is rotated by the power of the engine or the motor transmitted via this driving belt. Furthermore, as illustrated in FIG. 2, an electromagnetic coil unit 4 is arranged in an annular space (hereinafter referred to as the electromagnetic coil unit accommodation groove) 24 formed by the outer tubular portion 21, the inner tubular portion 22, and the connection portion 23.

The armature 3 is arranged opposite the rotor 2, and is connected to a rotating shaft 9. The armature 3 includes a tubular hub 31 having a flange portion, a disc-like armature plate 32 formed of a magnetic material, a plurality (three, in this example) of leaf springs 33, and a triangular plate-like vibration damper 34.

The hub 31 is, for example, splined to an end portion of the rotating shaft (driving shaft) 9 of the compressor (indicated by the broken line in FIG. 2) protruding to the exterior of a housing 8, and, in this state, the hub 31 is fixed (connected) to the rotating shaft 9 by a nut (not shown). The armature plate 32 is arranged opposite the connection portion (the armature side one end surface portion) 23 of the rotor 2. One end portion of each leaf spring 33 is fixed to the flange portion of the hub 31 by a rivet 35 along with the vibration damper 34, and the other end portion thereof is fixed to the armature plate 32 by a rivet 36. Each leaf spring 33 urges the armature plate 32 away from the connection portion 23 of the rotor 2, whereby a predetermined gap g is formed between the connection portion 23 of the rotor 2 and the armature plate 32. A vibration proof rubber 37 is attached to a portion near each apex of the vibration damper 34. The vibration damper 34 and the vibration proof rubber 37 are fixed to the armature plate 32 by a rivet 38, and attenuate vibration generated in the armature plate 32.

The electromagnetic coil unit 4 has an electromagnetic coil 41, and, by electric power supplied to this electromagnetic coil 41, the rotor 2 and the armature 3 are magnetically attracted to each other, making it possible to transmit the power of the drive source to the compressor as the driven apparatus. The electromagnetic coil unit 4 includes the electromagnetic coil 41 (which is illustrated in FIG. 1 as closely wound around a bobbin), a bobbin 42 around which the electromagnetic coil 41 is wound, and a field core 43. To one end portion side of the electromagnetic coil 41, a thermal fuse 5 and a thermally actuated switch 6 are connected. The connection relationship between the electromagnetic coil 41, the thermal fuse 5, and the thermally actuated switch 6 will be described in detail below.

The bobbin 42 has a cylindrical portion 421, a first flange portion 422, and a second flange portion 423. The cylindrical portion 421 is formed in a cylindrical shape, and the electromagnetic coil 41 is wound around the outer peripheral surface of the cylindrical portion 421. The first flange portion 422 is provided at one end portion of the cylindrical portion 421, and is opposite the connection portion 23 of the rotor 2. The second flange portion 423 is provided at the other end portion of the cylindrical portion 421. An electric power supply connector 44 is attached to the outer surface of the second flange portion 423 (that is, the end surface on the side opposite the armature 3). An electric power source side connector (not illustrated) is connected to the electric power supply connector 44, and it possible to supply electric power to the electromagnetic coil 41. In the present embodiment, the first flange portion 422 corresponds to the "flange portion" of the present invention.

Similar to the rotor 2, the field core 43 is formed in an annular shape. That is, the field core 43 has an outer tubular portion 431, an inner tubular portion 432 arranged concentrically with the outer tubular portion 431, and an annular plate connection portion 433 connecting the outer tubular portion 431 and the inner tubular portion 432 at one end side. The connection portion 433 has a through-hole through which the electric power supply connector 44 is passed. The field core 43 accommodates the bobbin 42 to which the electric power supply connector 44 is mounted in a space 434 formed by the outer tubular portion 431, the inner tubular portion 432, and the connection portion 433 (hereinafter referred to as the bobbin accommodation groove). More specifically, the field core 43 accommodates the proximal end portion of the electric power supply connector 44 and the bobbin 42 in the bobbin accommodation groove 434 in a state in which the distal end side of the electric power supply connector 44 is exposed to the exterior via the through-hole. After that, the interior of the bobbin accommodation groove 434 is filled with resin 45. By this filled resin 45, the electromagnetic coil 41 is sealed along with the thermal fuse 5 and the thermally actuated switch 6, and the electromagnetic coil 41, the bobbin 42, the field core 43, and the electric power supply connector 44 are integrated to make the electromagnetic coil unit 4. Furthermore, as illustrated in FIG. 2, a mounting plate 46 is mounted to an end surface of the field core 43. The electromagnetic coil unit 4 is installed in (fixed to) the compressor housing 8 via the mounting plate 46, and, in this state, the electromagnetic coil unit 4 is accommodated in the electromagnetic coil unit accommodation groove 24 of the rotor 2.

When a temperature of the thermal fuse 5 exceeds a predetermined operational temperature (fusing temperature) Tf, the thermal fuse 5 is blown to turn off (interrupt) the electric power supply to the electromagnetic coil 41. The thermal fuse 5 is a so-called blown type fuse, and is arranged in the vicinity of the connection portion 23 which is the armature side one end surface portion of the rotor 2 so as to easily detect the frictional heat between the rotor 2 and the armature 3. For example, the thermal fuse 5 is arranged close to the connection portion 23 side (that is, the armature 3 side) within the electromagnetic coil unit accommodation groove 24 of the rotor 2 along with the electromagnetic coil unit 4.

The thermally actuated switch 6 is connected in series to the electromagnetic coil 41 along with the thermal fuse 5, and is a switch having a thermally actuated member (element) displaced in response to temperature change. For example, the thermally actuated switch 6 is a bimetal switch. When a temperature of the thermally actuated switch 6 exceeds a predetermined temperature (hereinafter referred to as the switching temperature) Ts, the thermally actuated member is displaced in the electric power supply OFF direction. After that, due to the electric power supply being OFF, the temperature of the electromagnetic coil 41 is lowered, whereby the thermally actuated member is displaced in the electric power supply ON direction. More specifically, in the thermally actuated switch 6, when a temperature in the vicinity of the thermally actuated member including the thermally actuated member temperature (that is, the switch vicinity temperature T2 described below) exceeds the switching temperature Ts due to self-heating of the electromagnetic coil 41 itself generated by the electric power supplied to the electromagnetic coil 41, the thermally actuated member is displaced in the electric power supply OFF direction. After that, when the thermally actuated member vicinity temperature becomes lower than, for example, the switching temperature Ts by reducing the temperature of the electromagnetic coil 41 itself by the turning OFF of the electric power supply, the thermally actuated member is displaced in the electric power supply ON direction. In the thermally actuated switch 6, the electric power supply to the electromagnetic coil 41 is turned ON/OFF such that the temperature in the vicinity of the thermal fuse 5 (thermal fuse vicinity temperature) T1 does not exceed the operational temperature Tf of the thermal fuse 5 due to the self-heating of the electromagnetic coil 41 itself generated by the electric power supplied to the electromagnetic coil 41.

Hereinafter, regarding the thermal fuse 5 and the thermally actuated switch 6, the respective schematic structures, their connection relationship with the electromagnetic coil 41, the specific arrangement position, an example of the set values of the operational temperature Tf and the switching temperature Ts, and the operation thereof, will be described.

Figure 3:
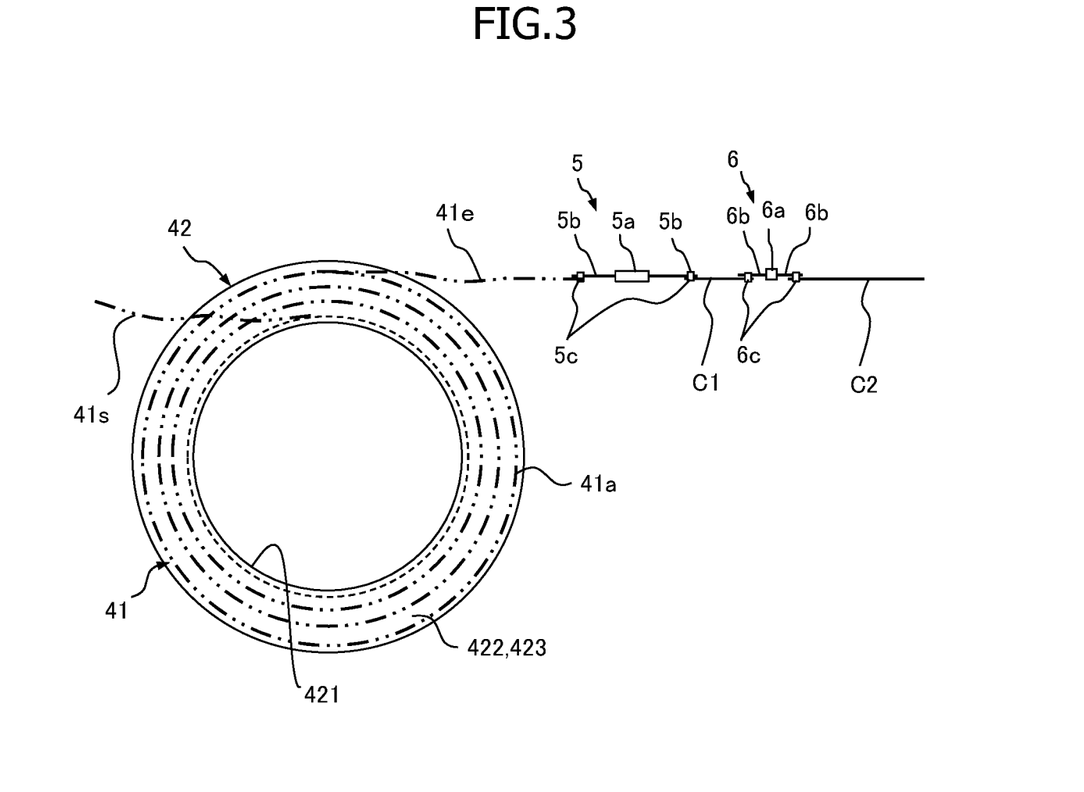
FIG. 3 is a conceptual view for illustrating the connection relationship between an electromagnetic coil, a thermal fuse, and a thermally actuated switch of the electromagnetic clutch.

First, with reference to FIG. 3, an example of the schematic structures of the thermal fuse 5 and the thermally actuated switch 6 will be described. More specifically, the thermal fuse 5 has a fuse main body portion 5a, and lead wires 5b respectively extending from both ends of this fuse main body portion 5a. In the fuse main body portion 5a, a fuse body is accommodated, the fuse body is adapted to be blown when the temperature thereof exceeds the operational temperature Tf, and the lead wires 5b are respectively electrically connected to both end portions of this fuse body. The thermally actuated switch 6 has a switch main body portion 6a and lead wires 6b respectively extending from both ends of the switch main body portion 6a. In the switch main body portion 6a, a bimetal member is accommodated, as the thermally actuated member which is displaced in the electric power supply OFF direction when the temperature thereof exceeds the switching temperature Ts, and after that, which is displaced (restored) in the electric power supply ON direction due to a reduction in temperature. The lead wires 6b are respectively electrically connected to both end portions of this bimetal member.

Next, with reference to FIG. 3, the connection relationship between the electromagnetic coil 41, the thermal fuse 5, and the thermally actuated switch 6 will be described. The electromagnetic coil 41, the thermal fuse 5, and the thermally actuated switch 6 are connected in series. More specifically, for example, a winding termination side end portion 41e of the electromagnetic coil 41 wound around the bobbin 42 is connected to an end portion of one lead wire 5b of the thermal fuse 5 via a connection terminal 5c. An end portion of the other lead wire 5b of the thermal fuse 5 is connected to one end portion of a connection intermediate copper wire C1 via the connection terminal 5c. The other end portion of this connection intermediate copper wire C1 is connected to an end portion of one lead wire 6b of the thermally actuated switch 6 via a connection terminal 6c. The end portion of the other lead wire 6b of the thermally actuated switch 6 is connected to one end portion of a connection termination end copper wire C2 via the connection terminal 6c. In this way, electromagnetic coil 41, the thermal fuse 5, and the thermally actuated switch 6 are connected in series. A winding start side end portion 41s of the electromagnetic coil 41 wound around the bobbin 42 is connected to one terminal (e.g., the minus side terminal) in an electric power supply connector 44 (see FIG. 2), and the other end portion of the connection termination end copper wire C2 is connected to the other terminal (e.g., the plus side terminal) in the electric power supply connector 44.

Figure 4:
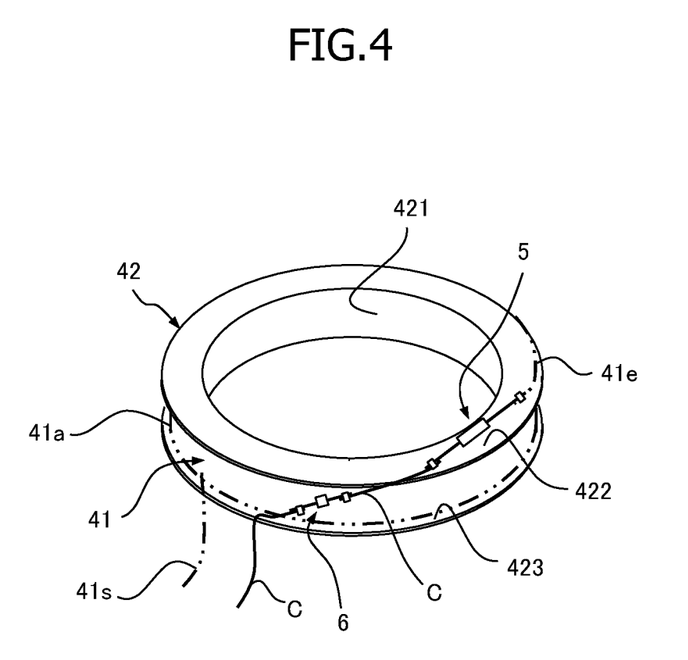
FIG. 4 is a conceptual view for illustrating the arrangement positions of the thermal fuse and the thermally actuated switch.

Next, with reference to FIGS. 1, 2, and 4, the arrangement position of the thermal fuse 5 and the thermally actuated switch 6 will be described, and an example of the set values of the operational temperature Tf and the switching temperature Ts will be described. In the present embodiment, the thermal fuse 5 is arranged on the outer surface (i.e., the armature side end surface) of the first flange portion 422 of the bobbin 42 so as to easily detect the frictional heat between the rotor 2 and the armature 3. On the other hand, the thermally actuated switch 6 is arranged inside the rotor 2 and at a position closer to the side of the other end surface portion of the rotor 2 (i.e., the end surface portion on the side opposite the armature 3) than the thermal fuse 5 so that the frictional heat may not be easily detected. More specifically, the thermally actuated switch 6 is arranged on a coil side surface 41a which is the outermost peripheral portion of the electromagnetic coil 41 wound around the cylindrical portion 421 of the bobbin 42 so that the frictional heat may be difficult to be detected and that the self-heating of the electromagnetic coil 41 may be easily detected. In the present embodiment, it is to be assumed that the operational temperature Tf of the thermal fuse 5 is set to a sufficiently lower value (e.g., 155° C.) than the conventional set value (e.g., 180° C.), for example. The lower the operational temperature Tf, the shorter the requisite time (fuse reaction time) from when the rotating shaft 9 is locked to when the thermal fuse 5 is operated, and the shorter the time for electric power supply to the electromagnetic coil 41 in the locked state. Thus, the lower the operational temperature Tf, the higher the reliability in the protection of components such as the bearing 7 of the rotor 2 and the driving belt, and the engine or the like. In a case in which the operational temperature Tf is not more than 155° C., it is possible to adopt a thermal fuse 5 containing no lead.

In the present embodiment, the switching temperature Ts of the thermally actuated switch 6 is set so as to coincide with the operational temperature Tf of the thermal fuse 5. That is, the switching temperature Ts and the operational temperature Tf are set to the same value (e.g., 155° C.). When electric power is supplied to the electromagnetic coil 41, due to the self-heating of the electromagnetic coil 41, itself caused by the electric power supply, the temperature of the electromagnetic coil 41 and the temperature of the periphery thereof increase. The maximum attainable temperature Tmax of the electromagnetic coil 41 due to the self-heating of the electromagnetic coil 41, itself under the severest conditions imaginable (atmospheric temperature or the like) is, for example, approximately 170° C. This temperature rise due to self-heating is higher at the coil side surface 41a than that on the outer surface of the first flange portion 422 of the bobbin 42. Thus, if, during normal operation in which the rotating shaft 9 is not locked, the temperature of the coil side surface 41a increases due to self-heating to attain, for example, 155° C., the temperature T1 in the vicinity of the thermal fuse 5 (thermal fuse vicinity temperature) arranged on the outer surface of the first flange portion 422 of the bobbin 42 is lower than 155° C. Thus, when, for example, the set value of the switching temperature Ts and the set value of the operational temperature Tf are the same, even if the operational temperature Tf of the thermal fuse 5 is set to a value lower than the conventional value, it is possible to turn ON/OFF the electric power supply to the electromagnetic coil 41 the thermally actuated switch 6 such that the thermal fuse vicinity temperature T1 does not exceed the operational temperature Tf of the thermal fuse 5 due to the self-heating of the electromagnetic coil 41. In this way, in the present embodiment, the thermally actuated switch 6 is arranged at a position at which the frictional heat between the rotor 2 and the armature 3 is difficult to detect and at which the self-heating of the electromagnetic coil 41 is easily detected, whereby malfunction of the thermal fuse 5 due to the self-heating of the electromagnetic coil 41 is prevented by the thermally actuated switch 6.

Next, the intermittent operation of power transmission to the compressor by the electromagnetic clutch 1 having the abovementioned configuration, will be briefly described.

First, in a state in which the thermal fuse 5 and the thermally actuated switch 6 are not operated, that is, in a state in which the thermal fuse vicinity temperature T1 does not reach the operational temperature Tf and in which the temperature T2 in the vicinity of the thermally actuated switch 6 (hereinafter referred to as the switch vicinity temperature) does not reach the switching temperature Ts (T1<Tf, and T2<Ts), the intermittent operation of power transmission will be described. In this state, the electric power supply to the electromagnetic coil 41 is ON/OFF-controlled by the air conditioner controller on the vehicle side. First, the rotor 2 is rotated by the rotational driving force output from the engine. In this state, when electric power is supplied to the electromagnetic coil 41, the electromagnetic coil unit 4 magnetizes the rotor 2, and causes the armature 3 to be attracted to the rotor 2 by the electromagnetic force, causing the armature 3 and the rotor 2 to synchronously rotate with each other by the frictional force therebetween. The rotational force of the armature 3 is transmitted to the rotating shaft 9 via the hub 31, and the rotating shaft 9 rotates to perform the compressing operation of the compressor. On the other hand, when the electric power supply to the electromagnetic coil 41 is interrupted by the vehicle side air conditioner controller, the rotor 2 is demagnetized and the armature 3 is separated apart from the rotor 2 by the restoring force of the leaf spring 33. The rotation of the rotor 2 is not transmitted to the armature 3, and the rotation of the rotating shaft 9 stops to stop the compressing operation of the compressor.

Next, for example, the operation during normal operation in which electric power is supplied to the electromagnetic coil 41 by the air conditioner controller and in which the rotating shaft 9 is not locked and in a state in which the switch vicinity temperature T2 exceeds the switching temperature Ts due to the self-heating of the electromagnetic coil 41 (T1<Tf, and T2 Ts), will be described. In this state, the thermal fuse vicinity temperature T1 does not exceed the operational temperature Tf which is set to be the same temperature as the switching temperature Ts. Thus, the thermal fuse 5 does not malfunction due to the self-heating of the electromagnetic coil 41. On the other hand, the thermally actuated switch 6 displaces the bimetal member thereof in the electric power supply OFF direction to turn off (interrupt) the electric power supply to the electromagnetic coil 41. As a result, the armature 3 is separated from the rotor 2, and the rotation of the rotating shaft 9 stops, stopping the compressing operation of the compressor. At the same time, the switch vicinity temperature T2 (that is, temperature of the coil side surface 41a in the present embodiment) is lowered. When the switch vicinity temperature T2 becomes lower than, for example, the switching temperature Ts, the thermally actuated switch 6 displaces the bimetal member thereof in the electric power supply ON direction to turn on the electric power supply to the electromagnetic coil 41 (resupply of electric power). After the electric power supply is turned off by the thermally actuated switch 6, the switch vicinity temperature T2 is rapidly lowered to a level below the switching temperature Ts, and thus, the stop period of the compressor is so short as to be negligible. Accordingly, the operation of the air conditioner is not greatly affected, and there is no possibility of great fluctuation in the vehicle interior temperature.

Next, for example, in the state in which electric power is supplied to the electromagnetic coil 41 by the air conditioner controller and in which the switch vicinity temperature T2 is stabilized without exceeding the switching temperature Ts (T2<Ts) due to the self-heating of the electromagnetic coil 41, the operation when the rotating shaft 9 starts to be locked. In the present embodiment, the operational temperature Tf of the thermal fuse 5 and the switching temperature Ts of the thermally actuated switch 6 coincide with each other, and furthermore, the thermal fuse vicinity temperature T1 immediately before the starting of the locking of the rotating shaft 9 is stable at a value lower than the switch vicinity temperature T2. Thus, when the rotating shaft 9 is locked, there is no possibility that the thermal fuse vicinity temperature T1 will exceed the operational temperature Tf due to the self-heating of the electromagnetic coil 41.

However, when the rotating shaft 9 begins to be locked, frictional heat is generated due to the friction between the rotor 2 and the armature 3, and it may occur that the thermal fuse vicinity temperature T1 exceeds the operational temperature Tf due to the frictional heat. That is, when the thermal fuse 5 operates prior to the thermally actuated switch 6 in a state in which the switch vicinity temperature T2 is stable without exceeding the switching temperature Ts, the rotating shaft 9 has been locked. Conventionally, the operational temperature Tf of the thermal fuse 5 is set, for example, to 180° C., whereas, in the present embodiment, it is set to 155° C. Thus, in a case in which the rotating shaft 9 starts to be locked, it is possible to quickly interrupt the electric power supply to the electromagnetic coil 41 due to the thermal fuse 5. As a result, after the locking of the rotating shaft 9, the armature 3 is separated from the rotor 2 in a shorter time than in the prior art, thus avoiding an excessive load from being applied to the drive source side such as the engine or the motor. At the same time, it is possible to prevent damage of components such as the bearing 7 of the rotor 2 and the driving belt to secure safe traveling of the vehicle.

In the electromagnetic clutch 1 of the present embodiment, the thermally actuated switch 6 turns ON/OFF the electric power supply to the electromagnetic coil 41 such that the thermal fuse vicinity temperature T1 does not exceed the operational temperature Tf due to the self-heating of the electromagnetic coil 41 itself. As a result, during normal operation in which the rotating shaft 9 is not locked, it is possible to prevent the thermal fuse 5 from malfunctioning due to the self-heating of the electromagnetic coil 41 by the thermally actuated switch 6. Thus, since it is possible to prevent the thermal fuse 5 from malfunctioning, the operational temperature Tf of the thermal fuse 5 can be set without taking into consideration the maximum attainable temperature Tmax due to the self-heating of the electromagnetic coil 41. As a result, it is possible to set the operational temperature Tf of the thermal fuse 5 at a lower level than in the prior art to quickly interrupt the electric power supply to the electromagnetic coil 41. Thus, for example, even in a low temperature atmosphere in which the temperature increase speed due to the frictional heat of the armature 3 and the rotor 2 is low, the electric power supply time in the locked state is shortened, and it possible to more reliably protect components such as the bearing of the rotor and the driving belt, and the drive source such as the engine. In this way, it is possible to provide an electromagnetic clutch 1 which, even in a low temperature atmosphere, can shorten the requisite time (fuse reaction time) from when the rotating shaft 9 is locked to when the thermal fuse operated while preventing or suppressing malfunction of the temperature fuse due to the self-heating of the electromagnetic coil.

Furthermore, in the present embodiment, the thermally actuated switch 6 is arranged at a position which is inside the rotor 2 and which is closer to the side of the other end surface portion of the rotor 2 (that is, on the end surface portion side opposite the armature 3) than the thermal fuse 5. As a result, the thermally actuated switch 6 is arranged at a position at which the frictional heat between the rotor 2 and the armature 3 is difficult to detect, and thus, it is possible to reduce the influence of the frictional heat to detect the self-heating of the electromagnetic coil 41 by the thermally actuated switch 6. More specifically, in the present embodiment, the thermal fuse 5 is arranged on the outer surface of the first flange portion 422 of the bobbin 42, and the thermally actuated switch 6 is arranged on the coil side surface 41a of the bobbin 42. Thus, the thermal fuse 5 can be arranged at a position at which the frictional heat is easily detected and at which the self-heating is difficult to detect, and the thermally actuated switch 6 can be arranged at a position at which the frictional heat is difficult to detect and at which the self-heating is easily detected. Accordingly, it is possible to improve the self-heating sensing precision by the thermally actuated switch 6 while easily preventing malfunction of the thermal fuse 5 due to the self-heating.

Furthermore, in the present embodiment, the operational temperature Tf of the thermal fuse 5 can be set at a sufficiently lower level than in the prior art, for example, which is approximately 155° C. or less than 155° C. Thus, it is possible to adopt an inexpensive blown type fuse containing no lead as a thermal fuse 5 and offer excellent advantages in terms of environmental protection.

Furthermore, in the present embodiment, the thermal fuse 5 and the thermally actuated switch 6 are arranged as described above, and then the switching temperature Ts of the thermally actuated switch 6 is set so as to coincide with the operational temperature Tf of the thermal fuse 5 (that is, Ts=Tf). In the electromagnetic clutch 1 of the present embodiment, as compared with the case in which the operational temperature Tf is set, for example, to 155° C. as in the present embodiment and the switching temperature Ts is set to a value lower than the operational temperature Tf (e.g., 150° C.) (that is, Ts<Tf), it is possible to reduce the number of times of the switching operation of the thermally actuated switch 6 due to the self-heating of the electromagnetic coil 41. As a result, in the electromagnetic clutch 1 of the present embodiment, when the operation of the air conditioner is required, it is possible to reduce the period of time during which the compressor has to be kept at rest in order to prevent malfunction of the thermal fuse 5 due to self-heating, and thus, it is possible for the driver or the like to perform driving or the like in the vehicle without experiencing any discomfort.

In the present embodiment, the switching temperature Ts is set so as to coincide with the operational temperature Tf; however, it is not limited to this. The switching temperature Ts may be set to a value lower than the operational temperature Tf. This makes it possible to more reliably prevent malfunction of the thermal fuse 5 due to the self-heating. Furthermore, in the present embodiment described above, the thermally actuated switch 6 is arranged on the coil side surface 41a which is the outermost peripheral portion of the electromagnetic coil 41; however, it is not limited to this. For example, the thermally actuated switch 6 may be arranged on the outer peripheral surface of the cylindrical portion 421 of the bobbin 42, or it may be arranged inside the electromagnetic coil 41 between this outer peripheral surface and the coil side surface 41a. That is, in the present embodiment, the arrangement of the thermal fuse 5 and the thermally actuated switch 6 is not limited to the arrangement illustrated in FIG. 2. The thermal fuse 5 may be arranged at a position at which the frictional heat is easily detected and at which the self-heating is difficult to detect, and on the other hand, the thermally actuated switch 6 may be arranged at a position at which the frictional heat is difficult to detect and at which the self-heating is easily detected.

Figure 5:
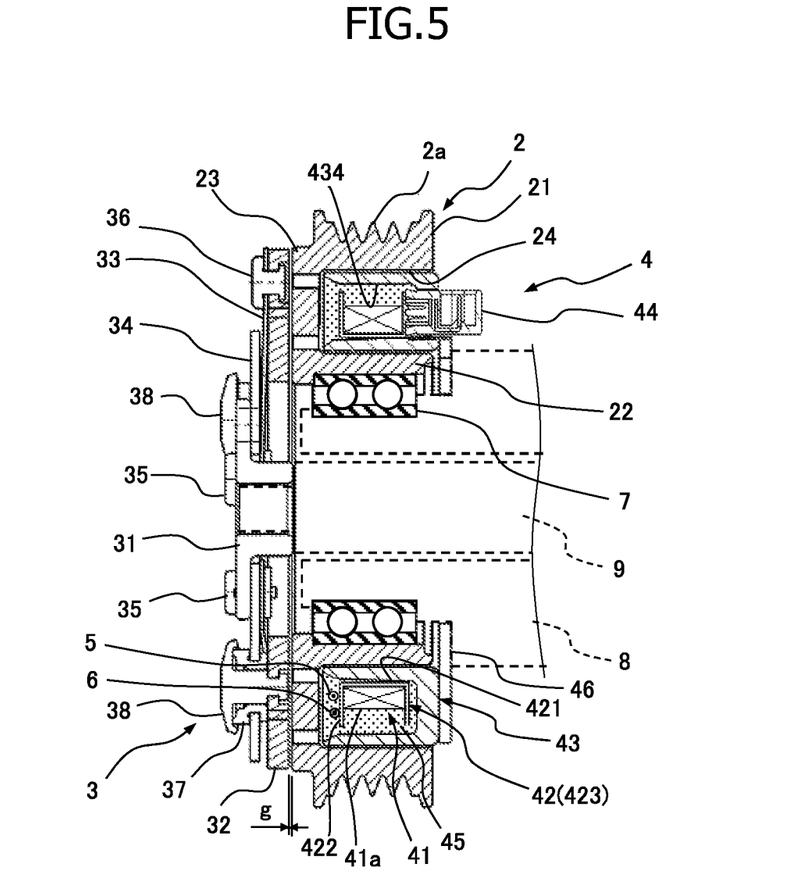
FIG. 5 is a sectional view of an electromagnetic clutch according to the second embodiment of the present invention.
Figure 6:
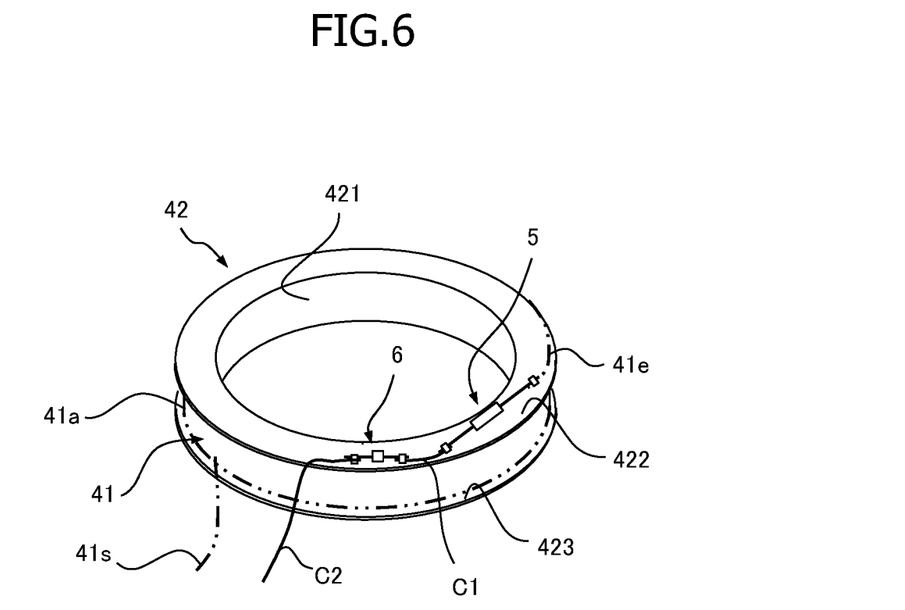
FIG. 6 is a conceptual view for illustrating the arrangement position of the thermally actuated switch according to the second embodiment.

FIGS. 5 and 6 illustrate the structure of the electromagnetic clutch 1 of the second embodiment of the present invention. FIG. 5 is a sectional view of the electromagnetic clutch 1, and FIG. 6 is a perspective view of a main portion thereof. This embodiment differs from the first embodiment in the arrangement position of the thermally actuated switch 6. The same reference numerals are used to denote elements similar to those in the first embodiment, and description thereof will be omitted, and only different elements will be described.

In the second embodiment, the thermally actuated switch 6 is arranged in the vicinity of the thermal fuse 5. More specifically, the thermally actuated switch 6 is arranged on the outer surface of the first flange portion 422 of the bobbin 42 and in the vicinity of the thermal fuse 5. Thus, in the second embodiment, the thermal fuse 5 and the thermally actuated switch 6 are arranged at the flange portion 422.

Furthermore, in the second embodiment, the switching temperature Ts of the thermally actuated switch 6 is set to be lower than the operational temperature Tf of the thermal fuse 5 and the temperature difference ΔTfs between the operational temperature Tf and the switching temperature (=Tf−Ts) is set to be less than a predetermined temperature difference ΔTos. The predetermined temperature difference ΔTos is a value obtained by subtracting the switching temperature Ts from a predetermined overshoot maximum temperature To in an overshoot phenomenon described below, and thus, the predetermined temperature difference ΔTos can be previously determined, and is, for example, approximately 15° C. For example, as in the first embodiment, the operational temperature Tf is set to be 155° C., and the switching temperature Ts is set to be lower than the operational temperature Tf and to be 150° C. so that ΔTfs may be less than ΔTos (=15° C.) (that is, Ts<Tf, and ΔTfs<ΔTos). In the second embodiment, the predetermined temperature difference ΔTos corresponds to the "predetermined value" of the present invention.

Next, the intermittent operation of power transmission with respect to the compressor by the electromagnetic clutch 1 of the second embodiment will be briefly described. The operation of the electromagnetic clutch 1 in the state in which the thermal fuse 5 and the thermally actuated switch 6 are not operated (T1<Tf, and T2<Ts), and the operation of the electromagnetic clutch 1 during normal operation in which the rotating shaft 9 is not locked but in a case in which the switch vicinity temperature T2 exceeds the switching temperature Ts (T1<Tf, and T2 Ts) are similar to the operation in the first embodiment, and thus, a description thereof will be omitted. In the following, for example, the operation in a case in which the rotating shaft 9 starts to be locked in a state in which electric power is supplied to the electromagnetic coil 41 by the air conditioner controller and in which, due to the self-heating of the electromagnetic coil 41, the switch vicinity temperature T2 is stable without exceeding the switching temperature Ts (T2<Ts) (state A), will be described.

Figure 7:
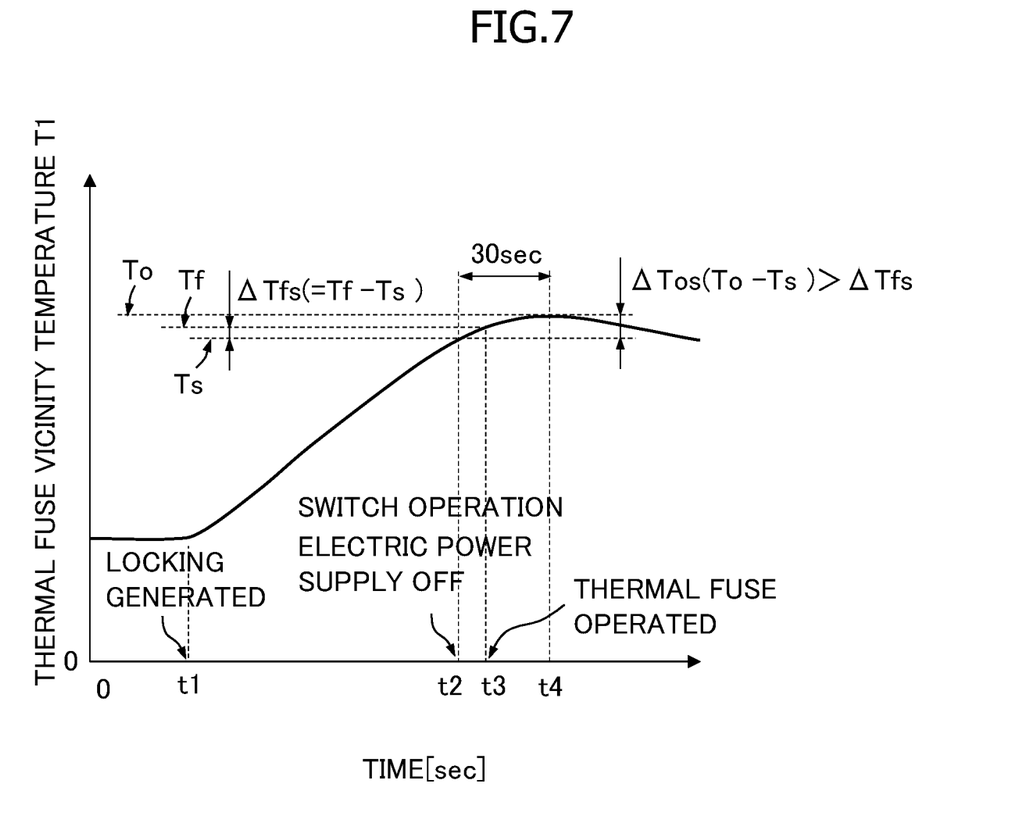
FIG. 7 is a view for illustrating an example of a change in the temperature in the vicinity of the thermal fuse according to the second embodiment.

FIG. 7 is a view for illustrating an example of a change in the thermal fuse vicinity temperature T1 when the rotating shaft 9 begins to be locked in the state A (t<t1). In FIG. 7, the horizontal axis indicates time, and the vertical axis indicates the thermal fuse vicinity temperature T1. When the rotating shaft 9 begins to be locked at time t1, the thermal fuse vicinity temperature T1 increases due to the frictional heat. In the second embodiment, the thermally actuated switch 6 is arranged in the vicinity of the thermal fuse 5, so that the temperature change in the switch vicinity temperature T2 and the temperature change in the thermal fuse vicinity temperature T1 approximate each other. Thus, FIG. 7 also illustrates an example of the temperature change in the switch vicinity temperature T2. Furthermore, in the second embodiment, the switching temperature Ts of the thermally actuated switch 6 is set to be lower than the operational temperature Tf of the thermal fuse 5, and thus, when the thermal fuse vicinity temperature T1 (=the switch vicinity temperature T2) exceeds the switching temperature Ts (t=t2), the thermally actuated switch 6 operates prior to the thermal fuse 5 to turn off the electric power supply to the electromagnetic coil 41.

Here, when the electric power supply is turned off, the armature 3 is separated from the rotor 2, so that no frictional heat is newly generated after the turning off of the electric power supply. However, for example, a predetermined period of time is required for the frictional heat generated by the time immediately before the turning off of the electric power supply and input to the rotor 2 via the connection portion 23 to be transmitted throughout the entire rotor 2. Thus, as illustrated in FIG. 7, even after the turning off of the electric power supply, the temperature in the rotor 2 continues to increase for a predetermined period of time (t2<t4, for example, for approximately 30 seconds), and is lowered when the input frictional heat has been completely transmitted throughout the entire rotor 2 (t=t4). Accordingly, there is a possibility that an overshoot phenomenon in which even after the electricity supply is turned off, the thermal fuse vicinity temperature T1 (=T2) exceeds (overshoots) the switching temperature Ts to be increased to a predetermined maximum temperature To, is generated.

In a case in which the rotating shaft 9 is locked, serious failure has been generated in the compressor, and thus, after the locking, in order that the electric power supply may not be restored, it is necessary to reliably operate the thermal fuse 5 to turn off the electric power supply to the electromagnetic coil 41, forcibly releasing the connection between the rotor 2 and the armature 3. For example, even if the switching temperature Ts is set to be lower than the operational temperature Tf, in a case in which the temperature difference ΔTfs between the operational temperature Tf and the switching temperature Ts is greater than the temperature difference ΔTos (that is, the overshoot amount) between the predetermined maximum temperature To in the overshoot phenomenon and the switching temperature Ts (ΔTfs>ΔTos), the thermal fuse vicinity temperature T1 is allowed to begin to be lowered before reaching the operational temperature Tf. Thus, before the thermal fuse 5 begins to operate, the thermal fuse vicinity temperature T1 becomes lower than the switching temperature Ts, and the electric power supply is allowed to be restored by the thermally actuated switch 6. In this respect, in the second embodiment, the temperature difference ΔTfs between the operational temperature Tf and the switching temperature Ts is set so as to be less than a predetermined temperature difference ΔTos (15° C.). Accordingly, it is possible to reliably operate the thermal fuse 5 so that the electric power supply may not be restored by the thermally actuated switch 6 after the rotating shaft 9 is locked. The temperature difference ΔTfs between the operational temperature Tf and the switching temperature Ts is not limited to 5° C. but may be set as appropriate so as to be less than the temperature difference ΔTos (the overshoot amount).

Furthermore, in the second embodiment, as illustrated in FIGS. 5 and 6, even if the thermally actuated switch 6 is arranged, for example, in the vicinity of the thermal fuse 5 on the outer surface of the first flange portion 422 of the bobbin 42, setting is made such that Ts<Tf, and thus, it is possible to reliably prevent malfunction of the thermal fuse 5 due to self-heating. Furthermore, the thermally actuated switch 6 is arranged on the outer surface of the first flange portion 422, whereby it is possible to effectively use the space at a portion of the coil side surface 41a and to reduce the outer diameter of the bobbin 42.

The Tf and Ts of the above embodiments are only given by way of example and allow setting as appropriate. Furthermore, in the above embodiments, as an example, the electromagnetic clutch attached to a compressor used in a vehicle air conditioner system, is described, the use of the electromagnetic clutch of the present invention is not limited thereto. It is also applicable to other uses.

The present invention is not limited to the preferred embodiments described above but allows various modifications and variations based on the technical idea of the present invention.

REFERENCE SYMBOL LIST 1 electromagnetic clutch
2 rotor
3 armature
4 electromagnetic coil unit
5 thermal fuse
6 thermally actuated switch
9 rotating shaft
23 connection portion (one end surface portion on the armature side)
41 electromagnetic coil
42 bobbin
421 cylindrical portion
422 flange portion
Tf operational temperature
Ts switching temperature (predetermined temperature)
T1 thermal fuse vicinity temperature
ΔTfs temperature difference between the operational temperature and the switching temperature (predetermined temperature)
ΔTos predetermined temperature difference (predetermined value)

The invention claimed is:
1. An electromagnetic clutch comprising:
a rotor rotated by power of a drive source;
an armature arranged opposite the rotor and connected to a rotating shaft of a driven apparatus;
an electromagnetic coil unit having an electromagnetic coil and causing the rotor and the armature to be magnetically attracted to each other by electric power supplied to the electromagnetic coil;
a thermal fuse arranged inside the rotor and configured to be blown when a temperature of the thermal fuse exceeds a predetermined operational temperature to turn OFF the electric power supply to the electromagnetic coil; and
a thermally actuated switch that is connected in series to the electromagnetic coil along with the thermal fuse, that is displaced in an electric power supply OFF direction when the temperature of the thermally actuated switch exceeds a predetermined temperature, and thereafter, is displaced in an electric power supply ON direction by a reduction in temperature, and the thermally actuated switch turning ON/OFF the electric power supply to the electromagnetic coil such that a thermal fuse vicinity temperature does not exceed the operational temperature due to self-heating of the electromagnetic coil itself generated by electric power supplied to the electromagnetic coil,
wherein the thermal fuse is arranged at a position closer to one end surface portion of the rotor on the armature side than the thermally actuated switch, and the thermally actuated switch is arranged inside the rotor and at a position closer to the other end surface portion side of the rotor than the thermal fuse.

2. The electromagnetic clutch according to claim 1, wherein the electromagnetic coil unit includes a bobbin having a cylindrical portion around which the electromagnetic coil is wound and a flange portion provided at one end portion of the cylindrical portion and opposite the armature side end surface portion;
the thermal fuse is arranged on the flange portion; and
the thermally actuated switch is arranged on a coil side surface that is the outermost peripheral portion of the electromagnetic coil wound around the cylindrical portion.

3. The electromagnetic clutch according to claim 1, wherein the predetermined temperature of the thermally actuated switch is set to coincide with the operational temperature of the thermal fuse.

4. An electromagnetic clutch comprising:
a rotor rotated by power of a drive source;
an armature arranged opposite the rotor and connected to a rotating shaft of a driven apparatus;
an electromagnetic coil unit having an electromagnetic coil and causing the rotor and the armature to be magnetically attracted to each other by electric power supplied to the electromagnetic coil;
a thermal fuse arranged inside the rotor and configured to be blown when a temperature of the thermal fuse exceeds a predetermined operational temperature to turn OFF the electric power supply to the electromagnetic coil; and
a thermally actuated switch that is connected in series to the electromagnetic coil along with the thermal fuse, that is displaced in an electric power supply OFF direction when the temperature of the thermally actuated switch exceeds a predetermined temperature, and thereafter, is displaced in an electric power supply ON direction by a reduction in temperature, and the thermally actuated switch turning ON/OFF the electric power supply to the electromagnetic coil such that a thermal fuse vicinity temperature does not exceed the operational temperature due to self-heating of the electromagnetic coil itself generated by electric power supplied to the electromagnetic coil,
wherein the predetermined temperature of the thermally actuated switch is set to be lower than the operational temperature of the thermal fuse and such that a temperature difference between the predetermined temperature and the operational temperature is less than a predetermined value,
the electromagnetic coil unit includes a bobbin having a cylindrical portion around which the electromagnetic coil is wound and a flange portion provided at one end portion of the cylindrical portion and opposite the armature side end surface portion, and
the thermal fuse and the thermally actuated switch are arranged on the flange portion.

5. A compressor equipped with an electromagnetic clutch according to claim 4.

6. A compressor equipped with an electromagnetic clutch according to claim 2.

7. A compressor equipped with an electromagnetic clutch according to claim 1.

* * * * *